(12) United States Patent
Todd et al.

(10) Patent No.: US 7,021,377 B2
(45) Date of Patent: Apr. 4, 2006

(54) METHODS OF REMOVING FILTER CAKE FROM WELL PRODUCING ZONES

(75) Inventors: Bradey L. Todd, Duncan, OK (US); Ronald J. Powell, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 258 days.

(21) Appl. No.: 10/661,173

(22) Filed: Sep. 11, 2003

(65) Prior Publication Data

US 2005/0056423 A1 Mar. 17, 2005

(51) Int. Cl.
*E21B 43/04* (2006.01)
*E21B 37/00* (2006.01)

(52) U.S. Cl. .............. 166/278; 166/300; 166/312; 507/241; 507/244; 507/269; 507/272; 507/927

(58) Field of Classification Search ............... 166/278, 166/291, 300, 305.1, 312; 175/72; 507/241, 507/244, 260, 267, 269, 272, 927
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |

(Continued)

FOREIGN PATENT DOCUMENTS

EP 0 510 762 A2 4/1992

(Continued)

OTHER PUBLICATIONS

Cantu, et al., "Laboratory and Field Evaluation of a Combined Fluid-Loss-Control Additive and Gel Breaker for Fracturing Fluids," SPE 18211 (1990).

(Continued)

*Primary Examiner*—George Suchfield
(74) *Attorney, Agent, or Firm*—Robert A. Kent; Baker Botts

(57) ABSTRACT

Methods are provided for removing filter cake containing a bridging agent soluble in a carboxylic acid salt from a formation fluids producing zone penetrated by a well bore. The methods basically comprise the steps of introducing in an aqueous carrier liquid a carboxylic acid ester and a base for slowly catalyzing the hydrolysis of the ester and forming a carboxylic acid salt therewith into the producing zone, and allowing the base to catalyze the hydrolysis of the carboxylic acid ester to form the carboxylic acid salt so that the carboxylic acid salt dissolves the bridging agent and the filter cake is removed.

34 Claims, No Drawings

U.S. PATENT DOCUMENTS

| | | | |
|---|---|---|---|
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/132 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B1 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,710,019 B1 | 3/2004 | Sawdon et al. | 507/136 |
| 6,761,218 B1 | 7/2004 | Nguyen et al. | 166/278 |
| 6,763,888 B1 * | 7/2004 | Harris et al. | 166/305.1 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034865 A1 * | 2/2005 | Todd et al. | 166/304 |

FOREIGN PATENT DOCUMENTS

| | | |
|---|---|---|
| EP | 0 879 935 A2 | 11/1998 |
| EP | 0 879 935 A3 | 10/1999 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO2001/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 04/037946 A1 | 5/2004 |
| WO | WO 04/038176 A1 | 5/2004 |

OTHER PUBLICATIONS

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived from Substituted Lactic Acids," Am. Chem. Soc., Ch. 12, 2001 (pp. 147-159).

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac[SM] Service, A Quick and Cost-Effective Method to Help Boost Production From Openhole Horizontal Completions*, Halliburton Communications, HO3297, 2002.

Halliburton, *Cobra Frac[SM] Service, Coiled Tubing Fracturing—Cost-Effective Method for Stimulating Untapped Reserves*, HO2319R, Halliburton Energy Services, 2000.

Halliburton, *CobraJet Frac[SM] Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

U.S. Appl. No. 10/650,101, Todd et al.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism," Engineering Information Inc., NY, NY, vol. . 101, No. 10 (XP-002322843), May 9, 1979.

U.S. Appl. No. 10/655,883, filed Sep. 5, 2003, Nguyen.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release* 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., A Chemical "Trigger" Useful for Oilfield Applications, Society of Petroleum Engineers, Inc., SPE 92709, Feb. 4, 2005.

\* cited by examiner

METHODS OF REMOVING FILTER CAKE FROM WELL PRODUCING ZONES

BACKGROUND OF THE INVENTION

1. Field of the Invention

The present invention relates to methods of removing filter cake deposited by well drilling or servicing fluids from well producing zones.

2. Description of the Prior Art

The use of special fluids for drilling or servicing hydrocarbon producing formations penetrated by well bores is well known. The drilling fluids are utilized when well bores are drilled into producing zones to minimize damage to the permeability of the zones and their ability to produce hydrocarbons. Servicing fluids are utilized when completion operations are conducted in producing zones and when conducting work-over operations in the zones. The drilling and servicing fluids deposit filter cake on the walls of the well bores within the producing zones which prevents the drilling and servicing fluids from being lost into the producing zones and prevents solids from entering the porosity of the producing zones. After the drilling or servicing of a producing formation has been completed, the filter cake is removed prior to placing the zone on production.

The removal of the filter cake from a producing formation has been accomplished in the past by including an acid soluble particulate solid bridging agent in the drilling or servicing fluid for bridging over the formation pores. The filter cake formed by the drilling or servicing fluid has heretofore been contacted with a strongly acidic solution so that the acid soluble bridging agent is dissolved. The acidic solution has been allowed to remain in contact with the filter cake for a period of time sufficient to dissolve the bridging particles. In spite of efforts to avoid it, the strongly acidic solution has often corroded metallic surfaces and completion equipment such as sand screens and caused their early failure. The strongly acidic solution can also be incompatible with the producing zone and cause damage thereto.

Filter cake often needs to be removed from the walls of open hole well bores penetrating producing zones in competent sandstone, in screen only open hole completions, in open hole carbonate wells and in gravel packed wells. However, the removal processes employed heretofore have often caused at least some damage to the permeability of the producing zones.

When the producing zone penetrated by a well bore is in an incompetent formation, i.e., a formation which contains loose sand and fines, gravel packs are commonly placed in the well bore adjacent to the incompetent producing zone to prevent the migration of the loose sand and fines with fluids produced from the zone. In forming a gravel pack in a producing zone penetrated by a well bore, a sand screen is typically positioned in the well bore adjacent the producing formation. A crossover tool which supports a packer is connected to the sand screen and to a pipe string. The packer is set by pipe movement or other procedure, and the crossover is a subassembly which by pipe movement or other procedure selectively allows fluids to flow from inside the pipe string to the outside of the sand screen, i.e., to the annulus between the sand screen and the walls of the well bore, and from the outside of the sand screen below the packer through the sand screen and the crossover to the annulus above the packer between the walls of the well bore and the pipe string. In operation, gravel, usually graded sand, is mixed with an aqueous carrier liquid, and the liquid containing the gravel is pumped down the pipe string through the crossover into the annulus between the walls of the well bore in the producing zone and the sand screen therein. The sand screen prevents the gravel deposited in the annulus from flowing through the sand screen but allows the carrier liquid to do so which is conducted through the crossover and upwardly through the annulus between the pipe string and the walls of the well bore to the surface. In this manner, a gravel pack is produced in the producing zone between the walls of the well bore penetrating the producing zone and the sand screen therein. The well is then produced by reversing the crossover tool and flowing fluids from the producing zone through the gravel pack and sand screen whereby migrating formation sand and fines are separated from the produced fluids and the produced fluids flow upwardly through the pipe string to the surface. The gravel used can be coated with a hardenable resin composition which hardens after placement of the gravel and forms the gravel into a hard permeable mass.

The removal of the filter cake formed on the open hole walls of the producing zone can be accomplished prior to the formation of a gravel pack therein. However, without the filter cake on the walls of the producing zone, the carrier liquid utilized to place the gravel will readily flow into the producing zone making the gravel pack very difficult to place in the producing zone, particularly when the well bore penetrating the zone is horizontal. In addition, the producing zone can be damaged by the flow of the carrier liquid and fine particulate material into the producing zone. In order to prevent the loss of the gravel carrier liquid, damage to the producing zone and/or the collapse of the well bore, the filter cake formed by the drilling or servicing fluid has been removed after the gravel pack is in place. However, the sand screen and gravel pack often prevent access to the entire filter cake and many post gravel pack treatments to remove the filter cake are only partially successful or not successful at all.

Thus, there are needs for improved methods of removing filter cake from well producing zones after gravel packs have been formed therein.

SUMMARY OF THE INVENTION

The present invention provides improved methods of treating open hole producing zones penetrated by well bores to remove filter cake therefrom without damaging the permeabilities of the producing zones.

The methods basically comprise the following steps. An aqueous carrier liquid containing a carboxylic acid ester and a base capable of slowly catalyzing the hydrolysis of the ester and forming a carboxylic acid salt therewith is introduced into a producing zone containing filter cake comprising a bridging agent soluble in a carboxylic acid salt. Thereafter, the base is allowed to catalyze the hydrolysis of the carboxylic acid ester to form the carboxylic acid salt so that the carboxylic acid salt dissolves the bridging agent whereby the filter cake is removed.

The methods are particularly useful in removing filter cake comprising bridging agent from an open hole producing zone after placing a permeable gravel pack therein with an aqueous carrier liquid. The methods comprise the following steps. A carboxylic acid ester and a base capable of slowly catalyzing the hydrolysis of the ester and forming a carboxylic acid salt therewith are combined with the aqueous carrier liquid. Gravel is then combined with the carrier liquid and the carrier liquid containing the gravel is introduced into the producing zone to form a permeable pack of the gravel in the well bore adjacent to the producing zone.

The base catalyzes the hydrolysis of the carboxylic acid ester and forms a carboxylic acid salt therewith in the carrier liquid remaining in the producing zone and the carboxylic acid salt is allowed to dissolve the bridging agent so that the filter cake is removed. Thereafter, formation fluids are produced from the producing zone through the gravel pack to the surface.

The objects, features and advantages of the present invention will be readily apparent to those skilled in the art upon a reading of the description of preferred embodiments which follows.

DESCRIPTION OF PREFERRED EMBODIMENTS

The present invention provides improved methods of treating open hole producing zones penetrated by well bores to remove filter cake therein without the use of strongly acidic solutions such as hydrochloric acid after placing a permeable gravel pack therein. The filter cake comprises a bridging agent which is soluble in carboxylic acid salts. Examples of bridging agents that can be used include, but are not limited to, calcium carbonate, magnesium oxide, manganese oxide, zinc oxide, zinc carbonate and calcium sulfate. Of these, calcium carbonate is preferred. The carboxylic acid salt soluble bridging agent is dissolved and removed from the producing zone after a permeable gravel pack is placed in the zone with an aqueous carrier liquid.

A method of this invention for removing filter cake containing a bridging agent soluble in a carboxylic acid salt from a formation fluids producing zone comprises the following steps. A carboxylic acid ester and a base capable of slowly catalyzing the hydrolysis of the ester and forming a carboxylic acid salt therewith is introduced into the producing zone. Thereafter, the base is allowed to catalyze the hydrolysis of the carboxylic acid ester to form the carboxylic acid salt so that the carboxylic acid salt dissolves the bridging agent and the filter cake is removed.

Another method of this invention for placing a permeable gravel pack in a formation fluids producing zone penetrated by a well bore and for removing filter cake therefrom comprising a bridging agent which is soluble in a carboxylic acid salt basically comprises the following steps. A carboxylic acid alkyl ester and a base capable of slowly catalyzing the hydrolysis of the carboxylic acid alkyl ester and forming a carboxylic acid salt therewith are combined with an aqueous carrier liquid. Gravel is combined with the carrier liquid, and the carrier liquid containing the gravel is introduced into the producing zone to form a permeable pack of the gravel in the well bore adjacent to the producing zone. Thereafter, the gravel pack has been placed, time is allowed for the base to catalyze the hydrolysis of the carboxylic acid ester and to form the carboxylic acid salt therewith in the carrier liquid remaining in the producing zone and for the carboxylic acid salt produced to dissolve the bridging agent whereby the filter cake is removed. Thereafter, formation fluids are produced from the producing zone through the permeable gravel pack to the surface.

As mentioned above, the drilling or servicing fluids utilized in the open hole producing zone to form a filter cake thereon prior to when a gravel pack is formed therein must include a carboxylic acid salt soluble bridging agent including, but not limited to, those described above. Preferred such bridging agents include calcium carbonate and magnesium oxide. Of these, calcium carbonate is the most preferred.

The aqueous carrier fluid which is utilized for forming a gravel pack in the producing zone can be selected from the group consisting of fresh water, unsaturated salt solutions and saturated salt solutions including brine and seawater. Preferably, the carrier liquid is an unsaturated salt solution.

A variety of carboxylic acid esters can be utilized in accordance with this invention. Examples of such carboxylic acid esters include, but are not limited to, ethylenediaminetetraacetic acid monomethyl ester $(NCH_2CH_2N)$ $(CH_2CO_2H)_3(CH_2CO_2CH_3)$; ethylenediaminetetraacetic acid dimethyl ester $(NCH_2CH_2N)(CH_2CO_2H)_2$ $(CH_2CO_2CH_3)_2$; ethylenediaminetetraacetic acid trimethyl ester $(NCH_2CH_2N)(CH_2CO_2H)(CH_2CO_2CH_3)_3$; ethylenediaminetetraacetic acid tetramethyl ester $(NCH_2CH_2N)$ $(CH_2CO_2CH_3)_4$; ethylenediaminetetraacetic acid monoethyl ester $(NCH_2CH_2N)(CH_2CO_2H)_3$—$(CH_2CO_2CH_2CH_3)$; ethylenediaminetetraacetic acid diethyl ester $(NCH_2CH_2N)$— $(CH_2CO_2H)_2(CH_2CO_2CH_2CH_3)_2$; ethylenediaminetetraacetic acid triethyl ester $(NCH_2CH_2N)(CH_2CO_2H)$ $(CH_2CO_2CH_2CH_3)_3$; ethylenediaminetetraacetic acid tetraethyl ester $(NCH_2CH_2N)(CH_2CO_2CH_2CH_3)_4$; ethylenediaminetetraacetic acid mono-2-hydroxy-ethyl ester $(NCH_2CH_2N)(CH_2CO_2H)_3(CH_2CO_2CH_2CH_2OH)$; ethylenediaminetetraacetic bis-2-hydroxyethyl ester $(NCH_2CH_2N)(CH_2CO_2H)_2(CH_2CO_2CH_2CH_2OH)_2$; diaminetetraacetic acid tris-2-hydroxyethyl ester $(NCH_2CH_2N)(CH_2CO_2H)$—$(CH_2CO_2CH_2CH_2OH)_3$; ethylenediaminetetraacetic acid tetrakis-2-hydroxyethyl ester $(NCH_2CH_2N)(CH_2CO_2CH_2CH_2OH)_4$; ethylenediaminetetraacetic acid monopropyleneglycol ester $(NCH_2CH_2N)$ $(CH_2CO_2H)_3(CH_2CO_2CH_2CH(OH)CH_3)$; ethylenediaminetetraacetic acid bispropyleneglycol ester $(NCH_2CH_2N)(CH_2CO_2H)_2(CH_2CO_2CH_2CH(OH)CH_3)_2$: ethylene-diaminetetraacetic acid trispropyleneglycol ester $(NCH_2CH_2N)(CH_2CO_2H)$—$(CH_2CO_2CH_2CH(OH)CH_3)_3$; ethylenediaminetetraacetic acid tetrakispropyleneglycol ester $(NCH_2CH_2N)(CH_2CO_2CH_2CH(OH)CH_3)_4$; ethylenediaminetetraacetic acid trispropylene-glycol ester-N-2-hydroxyethylamide $(NCH_2CH_2N)(CH_2CONHCH_2CH_2OH)$— $(CH_2CO_2CH_2CH(OH)CH_3)_3$; ethylenediaminetetraacetic acid bispropyleneglycol ester-N-2-hydroxyethyl diamide $(NCH_2CH_2N)(CH_2CONHCH_2CH_2OH)_2(CH_2CO_2CH_2CH$ $(OH)CH_3)_2$; ethylenediaminetetraacetic acid trispropyleneglycol ester-N-2-aminoethyl amide $(NCH_2CH_2N)$ $(CH_2CONHCH_2CH_2NH_2)(CH_2CO_2CH_2CH(OH)CH_3)_3$; and ethylenediamine-tetraacetic acid trispropyleneglycol ester-N,N'-dipropylamide $(NCH_2CH_2N)$-$(CH_2CON$ $(CH_2CH_2CH_3)_2)(CH_2CO_2CH_2CH(OH)CH_3)_3$. Of the foregoing esters, ethylenediaminetetraacetic acid (EDTA) tetramethyl ester is preferred.

The carboxylic acid ester utilized is generally dissolved in the aqueous carrier liquid in an amount in the range of from about 2% to about 20% by weight of the carrier liquid, preferably in an amount in the range of from about 5% to about 10%.

The base capable of slowly catalyzing the hydrolysis of the ester and forming a carboxylic acid salt therewith which is suspended or dissolved in the aqueous carrier fluid includes, but is not limited to, urea and bases such as sodium hydroxide and sodium carbonate encapsulated in a material which slowly releases the bases in water. Of these, urea is preferred. The base utilized forms an anion which combines with the carboxylic acid of the ester to form a carboxylic acid salt after the carboxylic acid ester has hydrolyzed. For example, at a temperature above about 160° F., urea generates ammonium which combines with the carboxylic acid. At temperatures below about 160° F., urease enzyme can be included with the urea which slowly converts the urea to ammonia. The base utilized is generally included in the carrier liquid in an amount in the range of from about 0.5% to about 5% by weight of the carrier liquid. When the base is urea and urease enzyme is included in the carrier liquid to convert urea to ammonia, the urease enzyme is included in an amount in the range of from about 0.025% to about 1% by weight of the carrier liquid.

As mentioned, the gravel mixed with the carrier liquid is usually graded sand, but it can also be particulate material such as bauxite, ceramics, glass and the like. Generally the gravel particles have a size in the range of from about 10 to about 70 mesh, U.S. Sieve Series. The size distribution ranges of the graded sand particles can be one or more of 10–20 mesh, 20–40 mesh, 40–60 mesh or 50–70 mesh, depending on the particular size and distribution of formation solids to be screened out by the gravel pack. The gravel is generally mixed with the carrier liquid in an amount in the range of from about 10% to about 60% by weight of the carrier liquid.

As is well understood by those skilled in the art, the present invention may be utilized with gravel packs installed with or without sand screens, with or without a hardenable resin coating on the gravel for consolidating the gravel and in vertical, horizontal or deviated well bores.

A preferred method of this invention for removing filter cake containing a bridging agent soluble in a carboxylic acid salt from a formation fluids producing zone penetrated by a well bore comprises the steps of: (a) introducing in an aqueous carrier liquid a carboxylic acid ester and a base capable of slowly catalyzing the hydrolysis of said ester and forming a carboxylic acid salt therewith into said producing zone; and (b) allowing said base to catalyze the hydrolysis of said carboxylic acid ester to form said carboxylic acid salt so that said carboxylic acid salt dissolves said bridging agent and said filter cake is removed.

Another preferred method of this invention for placing a permeable gravel pack in a formation fluids producing zone penetrated by a well bore and for removing filter cake therefrom comprising a bridging agent which is soluble in a carboxylic acid salt comprises the steps of: (a) combining with an aqueous carrier liquid a carboxylic acid ester and a base capable of slowly catalyzing the hydrolysis of the ester and forming a carboxylic acid salt therewith; (b) combining gravel with the carrier liquid; (c) introducing the carrier liquid containing the gravel into the producing zone to form a permeable pack of the gravel in the well bore adjacent thereto; (d) allowing the base to catalyze the hydrolysis of the carboxylic acid ester and to form the carboxylic acid salt therewith in the carrier liquid remaining in the producing zone and the carboxylic acid salt to dissolve the bridging agent whereby said filter cake is removed; and (e) producing formation fluids from the producing zone through the permeable gravel pack to the surface.

As mentioned previously, the carboxylic acid salt soluble bridging agent can be calcium carbonate, magnesium dioxide, zinc oxide, zinc carbonate and calcium sulfate with calcium carbonate being preferred. The aqueous carrier liquid can be fresh water, unsaturated salt solutions and saturated salt solutions with unsaturated salt solutions being preferred. The carboxylic acid ester can be any suitable carboxylic acid ester with ethylenediaminetetraacetic acid (EDTA) esters being preferred. The carboxylic acid ester is dissolved in the aqueous carrier liquid in an amount in the general range of from about 2% to about 20% by weight of the carrier liquid. The base capable of slowly catalyzing the hydrolysis of the ester and forming a carboxylic acid salt therewith can be, but is not limited to, urea, and encapsulated sodium hydroxide or sodium carbonate. Of these, urea is preferred. The base is included in the aqueous carrier liquid in an amount in the range of from about 0.5% to about 5% by weight of the carrier liquid. The gravel mixed with the carrier liquid is preferably graded sand.

Yet another preferred method of this invention for placing a permeable gravel pack in a formation fluids producing zone penetrated by a well bore to remove filter cake therefrom comprising a calcium carbonate bridging agent which is soluble in a carboxylic acid salt comprises the steps of: (a) combining with an aqueous carrier liquid an ethylenediaminetetraacetic acid tetramethyl ester and urea for slowly catalyzing the hydrolysis of the ester and forming an ethylenediaminetetraacetic acid ammonium salt therewith; (b) combining gravel with the carrier liquid; (c) introducing the carrier liquid containing the gravel into the producing zone to form a permeable pack of the gravel in the well bore adjacent thereto; (d) allowing the urea to catalyze the hydrolysis of the ethylenediaminetetraacetic acid tetramethyl ester and to form an ethylenediaminetetraacetic acid ammonium salt therewith in the carrier liquid remaining in the producing zone and the ethylenediaminetetraacetic acid ammonium salt to dissolve the calcium carbonate bridging agent; and (e) producing formation fluids from the producing zone through the permeable gravel pack to the surface.

The aqueous carrier liquid is preferably an unsaturated salt solution and the ethylene-diaminetetraacetic acid tetramethyl ester is dissolved in the aqueous carrier liquid in an amount in the range of from about 5% to about 20% by weight of the carrier liquid. The urea is preferably dissolved in the carrier liquid in an amount in the range of from about 0.5% to about 5% by weight of the carrier liquid and the gravel is preferably graded sand. When the temperature in the producing zone is below about 160° F., a urease enzyme for accelerating the hydrolysis of the ester and forming the ethylenediaminetetraacetic ammonium salt is included in the carrier liquid. When used, the urease enzyme is included in the aqueous carrier liquid in an amount in the range of from about 0.025% to about 1% by weight of the carrier liquid.

In order to further illustrate the methods of the present invention, the following examples are given.

EXAMPLE

The effect of ethylenediaminetetraacetic acid (EDTA) tetramethyl ester in combination with urea, urease and both urea and urease on the solubilization of calcium carbonate was tested in the laboratory. Samples were prepared comprised of a 2% by weight aqueous potassium chloride solution and 0.15 grams of calcium carbonate powder. A first sample contained only the potassium chloride solution and the calcium carbonate powder. To a second sample, 0.5 gram of urea was first dissolved in the potassium chloride solution followed by the addition of the calcium carbonate powder. To a third sample, 0.5 gram of urea was dissolved in the potassium chloride solution followed by 0.62 gram of EDTA tetramethyl ester and then the calcium carbonate powder. To a fourth sample, 0.5 gram of urea was dissolved in the potassium chloride solution followed by 0.62 gram of EDTA tetramethyl ester, 0.1 milliliter of urease and the calcium carbonate powder. The samples were maintained at ambient conditions (~70° F.) for 30 days after which the amounts of carbonate powder remaining in the samples were determined. The results of these set forth in the table below.

TABLE

| Sample No. | Amount of Urea, g | Amount of Urease, ml | Amount of EDTA tetramethyl ester, g | Amount of calcium carbonate powder remaining, % |
|---|---|---|---|---|
| 1 | 0 | 0 | 0 | 100 |
| 2 | 0.5 | 0 | 0 | 100 |
| 3 | 0.5 | 0 | 0.62 | 50 |
| 4 | 0.5 | 0.1 | 0.62 | 0 |

From the Table it can be seen that the carboxylic acid ester and the base comprised of urea and urease effectively dissolved the calcium carbonate powder.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

The invention claimed is:

1. A method of removing filter cake containing a bridging agent soluble in a carboxylic acid salt from a formation fluids producing zone penetrated by a well bore comprising the steps of:
    (a) introducing in an aqueous carrier liquid a carboxylic acid ester and a base capable of slowly catalyzing the hydrolysis of said ester and forming a carboxylic acid salt therewith into said producing zone; and
    (b) allowing said base to catalyze the hydrolysis of said carboxylic acid ester to form said carboxylic acid salt so that said carboxylated acid salt dissolves said bridging agent and said filter cake is removed.

2. The method of claim 1 wherein said carboxylic acid salt soluble bridging agent is selected from the group consisting of calcium carbonate bridging agent, magnesium oxide bridging agent, zinc oxide bridging agent, zinc carbonate and calcium sulfate.

3. The method of claim 1 wherein said carboxylic acid salt soluble bridging agent is calcium carbonate bridging agent.

4. The method of claim 1 wherein said aqueous carrier liquid is selected from the group consisting of fresh water, unsaturated salt solutions and saturated salt solutions.

5. The method of claim 1 wherein said aqueous carrier liquid is an unsaturated salt solution.

6. The method of claim 1 wherein said carboxylic acid ester is an ethylenediaminetetraacetic acid ester.

7. The method of claim 1 wherein said carboxylic acid ester is ethylenediaminetetraacetic acid tetramethyl ester.

8. The method of claim 1 wherein said carboxylic acid ester is present in said aqueous carrier liquid in an amount in the range of from about 2% to about 20% by weight of said carrier liquid.

9. The method of claim 1 wherein said base capable of slowly catalyzing the hydrolysis of said ester and forming a carboxylic acid salt therewith is selected from the group consisting of urea and encapsulated bases.

10. The method of claim 1 wherein said base capable of slowly catalyzing the hydrolysis of said ester and forming a carboxylic acid salt therewith is urea.

11. The method of claim 10 wherein said aqueous carrier liquid further comprises a urease enzyme for accelerating the hydrolysis of said ester and forming said carboxylic acid salt at temperatures below about 160° F.

12. The method of claim 11 wherein said urease enzyme is included in said aqueous carrier liquid in an amount in the range of from about 0.025% to about 1% by weight of said carrier liquid.

13. The method of claim 1 wherein said base capable of slowly catalyzing the hydrolysis of said ester and forming a carboxylic acid salt therewith is dissolved in said aqueous carrier liquid in an amount in the range of from about 0.5% to about 5% by weight of said carrier liquid.

14. A method of placing a permeable gravel pack in a formation fluids producing zone penetrated by a well bore and for removing filter cake therefrom that comprises a bridging agent which is soluble in a carboxylic acid salt comprising the steps of:
    (a) combining with an aqueous carrier liquid a carboxylic acid ester and a base capable of slowly catalyzing the hydrolysis of said ester and forming a carboxylic acid salt therewith;
    (b) combining gravel with said carrier liquid;
    (c) introducing said carrier liquid containing said gravel into said producing zone to form a permeable pack of said gravel in said well bore adjacent thereto;
    (d) allowing said base to catalyze the hydrolysis of said carboxylic acid ester and to form said carboxylic acid salt therewith in said carrier liquid remaining in said producing zone and said carboxylic acid salt to dissolve said bridging agent whereby said filter cake is removed; and
    (e) producing formation fluids from said producing zone through said permeable gravel pack to the surface.

15. The method of claim 14 wherein said carboxylic acid salt soluble bridging agent is selected from the group consisting of calcium carbonate bridging agent, magnesium oxide bridging agent, zinc oxide bridging agent, zinc carbonate and calcium sulfate.

16. The method of claim 14 wherein said carboxylic acid salt soluble bridging agent is calcium carbonate bridging agent.

17. The method of claim 14 wherein said aqueous carrier liquid is selected from the group consisting of fresh water, unsaturated salt solutions and saturated salt solutions.

18. The method of claim 14 wherein said aqueous carrier liquid is an unsaturated salt solution.

19. The method of claim 14 wherein said carboxylic acid ester is an ethylenediaminetetraacetic acid ester.

20. The method of claim 14 wherein said carboxylic acid ester is ethylenediaminetetraacetic acid tetramethyl ester.

21. The method of claim 14 wherein said carboxylic acid ester is dissolved in said aqueous carrier liquid in an amount in the range of from about 2% to about 20% by weight of said carrier liquid.

22. The method of claim 14 wherein said base capable of slowly catalyzing the hydrolysis of said ester and forming a carboxylic acid salt therewith is selected from the group consisting of urea and encapsulated bases.

23. The method of claim 14 wherein said base capable of slowly catalyzing the hydrolysis of said ester and forming a carboxylic acid salt therewith is urea.

24. The method of claim 23 wherein said aqueous carrier liquid further comprises a urease enzyme for accelerating the hydrolysis of said ester and forming said carboxylic acid salt at temperatures below about 160° F.

25. The method of claim 24 wherein said urease enzyme is included in said aqueous carrier liquid in an amount in the range of from about 0.025% to about 1% by weight of said carrier liquid.

26. The method of claim 14 wherein said base capable of slowly catalyzing the hydrolysis of said ester and forming a carboxylic acid salt therewith is dissolved in said aqueous carrier liquid in an amount in the range of from about 0.5% to about 5% by weight of said carrier liquid.

27. The method of claim 14 wherein said gravel is graded sand.

28. A method of placing a penneable gravel pack in a formation fluids producing zone penetrated by a well bore and to remove filter cake therefrom that comprises a calcium carbonate bridging agent which is soluble in a carboxylic acid salt comprising the steps of:
 (a) combining with an aqueous carrier liquid an ethylenediaminetetraacetic acid tetramethyl ester and urea for slowly catalyzing the hydrolysis of said ester and forming an ethylenediaminetetraacetic acid animonium salt therewith;
 (b) combining gravel with said carrier liquid;
 (c) introducing said carrier liquid containing said gravel into said producing zone to form a permeable pack of said gravel in said well bore adjacent thereto;
 (d) allowing said urea to catalyze the hydrolysis of said ethylenediaminetetraacetic acid tetramethyl ester and to form said ethylenediaminetetraacetic acid ammonium salt therewith in said carrier liquid remaining in said producing zone and said ethylenediaminetetraacetic acid ammonium salt to dissolve said calcium carbonate bridging agent; and
 (e) producing formation fluids from said producing zone through said permeable gravel pack to the surface.

29. The method of claim 28 wherein said aqueous carrier liquid is an unsaturated salt solution.

30. The method of claim 28 wherein said ethylenediaminetetraacetic acid tetramethyl ester is dissolved in said aqueous carrier liquid in an amount in the range of from about 2% to about 20% by weight of said carrier liquid.

31. The method of claim 28 wherein said urea is dissolved in said aqueous carrier liquid in an amount in the range of from about 0.5% to about 5% by weight of said carrier liquid.

32. The method of claim 28 wherein said gravel is graded sand.

33. The method of claim 28 wherein said aqueous carrier liquid further comprises a urease enzyme for accelerating the hydrolysis of said ester and forming said carboxylic acid salt at temperatures below about 160° F.

34. The method of claim 33 wherein said urease enzyme is included in said aqueous carrier liquid in an amount in the range of from about 0.025% to about 1% by weight of said carrier liquid.

* * * * *